US006314365B1

(12) United States Patent
Smith

(10) Patent No.: US 6,314,365 B1
(45) Date of Patent: Nov. 6, 2001

(54) METHOD AND SYSTEM OF PROVIDING NAVIGATION SERVICES TO CELLULAR PHONE DEVICES FROM A SERVER

(75) Inventor: Nicholas E. Smith, Oak Park, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/484,144

(22) Filed: Jan. 18, 2000

(51) Int. Cl.[7] .................................................. G06F 165/00
(52) U.S. Cl. .......................... 701/200; 701/201; 701/208; 701/211; 701/214; 342/357.01; 342/357.09; 342/357.13; 340/988; 340/995
(58) Field of Search ..................................... 701/200, 201, 701/207, 208, 209, 211, 212, 213, 214; 342/357.01, 357.06, 357.09, 357.13, 357.15; 340/988, 990, 995; 455/456, 524

(56) References Cited

U.S. PATENT DOCUMENTS

| 5,182,555 | 1/1993 | Sumner . |
| 5,696,503 | 12/1997 | Nasburg . |
| 5,890,070 | 3/1999 | Hamada ............................... 455/524 |
| 5,948,042 | 9/1999 | Heimann et al. . |
| 6,011,515 | 1/2000 | Radcliffe et al. ..................... 340/936 |
| 6,029,069 | * 2/2000 | Takaki ................................... 455/456 |
| 6,138,003 | * 10/2000 | Kingdon et al. ...................... 455/410 |
| 6,166,626 | * 12/2000 | Janky et al. .......................... 340/426 |

FOREIGN PATENT DOCUMENTS

| 0921509 | 6/1999 | (EP) . |
| WO 96/01531 | 1/1996 | (WO) . |
| WO 96/42179 | 12/1996 | (WO) . |
| WO 98/54682 | 12/1998 | (WO) . |

* cited by examiner

Primary Examiner—William A. Cuchlinski, Jr.
Assistant Examiner—Gertrude Arthur
(74) Attorney, Agent, or Firm—Frank J. Kozak; Lawrence M. Kaplan

(57) ABSTRACT

A method and system for providing navigation services to portable communications devices, such as cellular phones. A cellular phone user uses a cellular phone to request navigation services. The cellular phone is located in a geographic area that has a cellular phone location determining system that determines the positions of cellular phones used throughout the area. The cellular phone location determining system is used to determine one or more locations of the cellular phone used to request the navigation services. A map matching program uses a map database that contains data indicating the locations of roads located throughout the geographic area to relate the position of the cellular phone to one or more roads. Optionally, a direction of travel of the cellular phone can be determined by the map matching program using data indicating multiple positions of the cellular phone over time. Data indicating the position with respect to roads located in the geographic area of the cellular phone used to request the navigation services is combined with the request for navigation services at a navigation services server. The navigation services server determines a response to the request for navigation services taking into account the location and/or direction of travel of the cellular phone.

20 Claims, 5 Drawing Sheets

METHOD AND SYSTEM OF PROVIDING NAVIGATION SERVICES TO CELLULAR PHONE DEVICES FROM A SERVER

BACKGROUND OF THE INVENTION

The present invention relates to providing navigation services to portable communications devices, such as cellular phones, pagers, PalmPilot®-type devices or other types of portable phone devices.

There are various different types of portable navigation systems that provide navigation-related features. One type of portable navigation system has a geographic database physically installed with the portable navigation system unit. This type of portable navigation system is sometimes installed in vehicles. Because this type of navigation system has its own geographic database, it is relatively autonomous, e.g., it can provide navigation-related features during normal operation without the need to obtain data or programs from an outside source. However, with this type of navigation system there is a need to install updated geographic data in the system from time-to-time. Also, the navigation features provided by this type of navigation system are limited to the data contained in the geographic database physically installed with the navigation system, i.e., it cannot be used to provide navigation-related services about geographic features that are not represented by the on-board geographic database.

Another type of navigation system does not use a geographic database installed locally with the navigation system unit. Instead, this type of navigation system uses a wireless communication link to access a remote geographic database. This type of navigation system does not require that updated geographic data be obtained from time-to-time for the in-vehicle navigation system because the remote geographic database can be updated as frequently as needed.

Another type of navigation system combines a local geographic database (i.e., one that is physically installed with the navigation system) and a remote database. The local database is used whenever possible but the remote database is used to obtain data which is not available locally. This type of navigation system is described in U.S. Pat. No. 5,542,789, the entire disclosure of which is incorporated by reference herein.

Each of the different types of navigation systems described above can be used with some kind of positioning system hardware component. The positioning system hardware component may implemented using any of various types of technology, such as GPS technology, dead reckoning technology (inertial sensors), or a combination of GPS and dead reckoning technology. The positioning system hardware component may be part of the navigation system or may be a standalone component. The positioning system hardware component determines where the navigation system is located. Using the information provided by the positioning system hardware component and data from a geographic database (wherever it is located), the navigation system can provide useful navigation-related features, such as determining a route from the current location of the navigation system to a desired destination or identifying all the businesses of a particular type close to the current location of the navigation system.

Although navigation systems, like those described above, provide many useful features, there is still a need for additional types of systems that can provide navigation services to users.

SUMMARY OF THE INVENTION

To address these and other objectives, the present invention comprises a method and system for providing navigation services to portable communications devices, such as cellular phones, pagers, personal information managers, PalmPilot®-type devices and other types of wireless phone devices. A cellular phone user uses a cellular phone to request navigation services. The cellular phone is located in a geographic area that has a cellular phone location determining system that determines the positions of cellular phones used throughout the area. The cellular phone location determining system is used to determine one or more locations of the cellular phone used to request the navigation services. A map matching program uses a map database that contains data indicating the locations of roads located throughout the geographic area to relate the position of the cellular phone to one or more roads. Optionally, a direction of travel of the cellular phone can be determined by the map matching program using data indicating multiple positions of the cellular phone over time. Data indicating the position of the cellular phone used to request the navigation services with respect to roads located in the geographic area is combined with the request for navigation services at a navigation services server. The navigation services server determines a response to the request for navigation services taking into account the location and/or direction of travel of the cellular phone.

In a further aspect of this system and method, the response to the request for navigation services may include instructions that are provided to the cellular phone user as the cellular phone user is traveling in the geographic area. As an example, if the requested navigation services include driving instructions to a desired destination, it is preferable that appropriate instructions be provided as the required driving maneuver is being approached. In order to provide these instructions in a timely manner, the cellular phone location determining system continues to determine the position of the cellular phone as the cellular phone user proceeds toward the desired destination. Data indicating the positions of the cellular phone user continue to be matched to roads represented by the map database using the map matching program as the cellular phone user follows the driving instructions and proceeds toward the destination. Based upon the positions of the cellular phone along roads, appropriate driving instructions are provided to the cellular phone user at appropriate times, such as when the required driving maneuvers are being approached. In this manner, the cellular phone user can be provided with navigation services similar to those provided by navigation systems.

In another alternative embodiment, the cellular phone is provided with positioning system hardware, such as a GPS system, by which the location of the cellular phone can be determined. According to this embodiment, the cellular phone is used to make a request for navigation services and the request is accompanied by data indicating the location of the cellular phone as determined by the positioning system hardware located in, or in communication with, the cellular phone. Using a map matching program, the location of the cellular phone is referenced to the road network represented by data contained in a map database. A navigation services server receives the request and provides a response taking into account the location of the cellular phone referenced to the road network.

DETAILED DESCRIPTION OF THE PRESENTLY PREFERRED EMBODIMENTS

I. FIRST EMBODIMENT

A first embodiment of the present system is described using cellular phone technology. These embodiments are not limited to cellular phone technology, but instead can be used with any type of portable communications device technology, including PCS/GSM, etc. These embodiments can also be used with any type of portable communications device or technology that conforms to the WAP specification.

Figure 1:
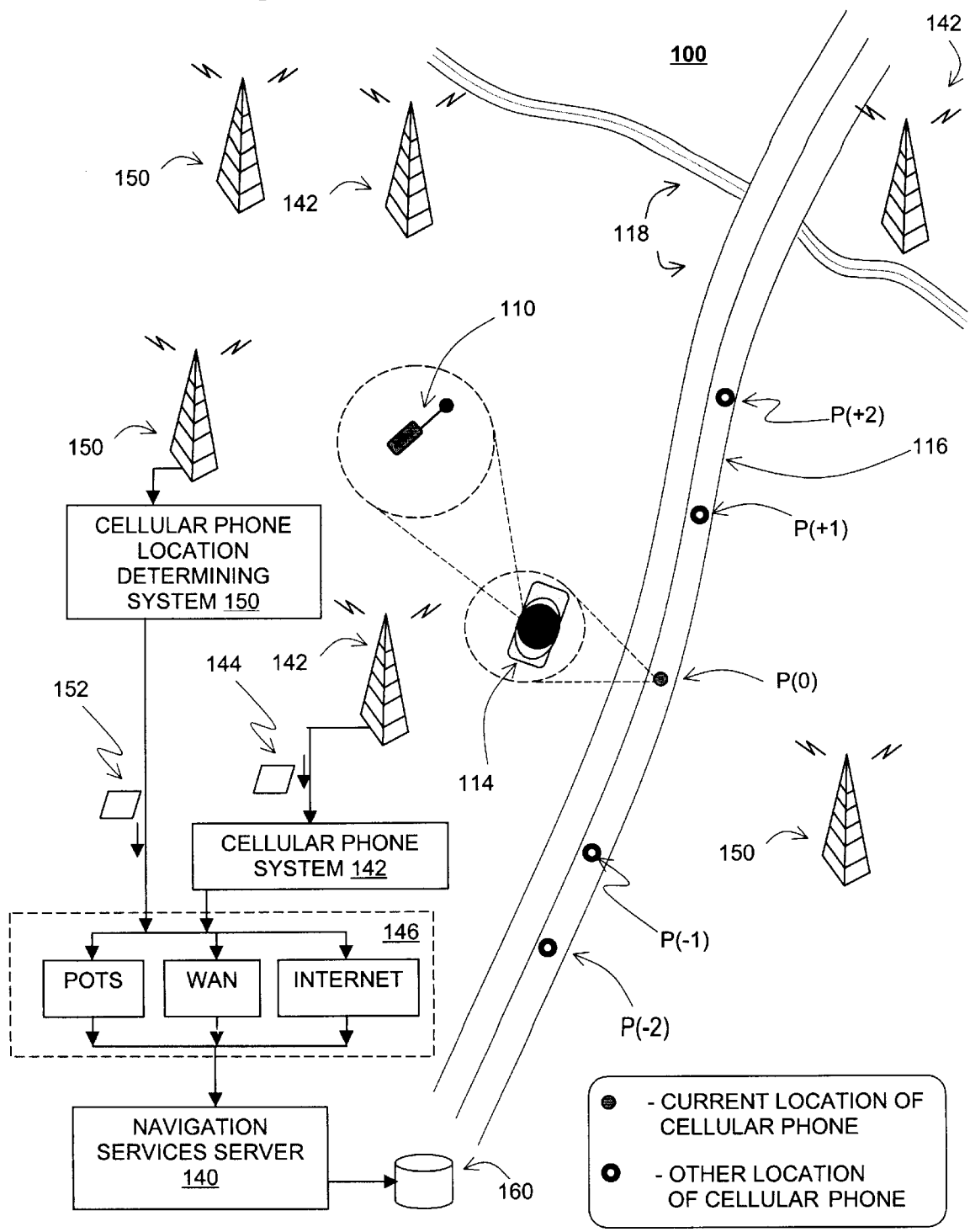
FIG. 1 is an illustration of a first embodiment of the present invention.

Referring to FIG. 1, there is an illustration of a portion of a geographic area 100. Located in the geographic area 100 is a cellular phone 110. The cellular phone 110 is being used by a cellular phone user. The cellular phone 110 and the user may be located in a vehicle 114 which is being driven along a road 116 which is part of the road network 118 located in the geographic area 100. The cellular phone 110 is at a position P(0) along the road 116 at a time (T=0). The cellular phone 110 was at prior positions, P(−1), P(−2), etc., along the road 116 at prior times T(−1), T(−2), etc., and the cellular phone 110 will be at positions, P(+1), P(+2), etc., along the road 116 at subsequent times T(+1), T(+2), etc.

When the cellular phone 110 is at the location P(0), the cellular phone user initiates a request 144 for navigation services. The request is made using the cellular hone 110. The request may be made using the cellular phone 110 in several different ways. One way that the request can be made is manually, e.g., by having the user press keys on the keypad and/or user interface of the cellular phone 110.

Another way to make the request for navigation services is to have the cellular phone user express the request vocally into the cellular phone 110. If the request is expressed vocally, the request may be made to a person at the other end of a telephone conversation or alternatively, if the request is expressed vocally, the vocal request may be interpreted by speech recognition programming located either locally (i.e., in the cellular phone 110) or remotely (e.g., at a location accessed by the cellular phone call).

According to still another alternative, if the request is expressed vocally, the request may be made partially to a person and partially to speech recognition programming.

According to yet another alternative, the request can be made using a combination of vocal input and manual input.

The request for navigation services may be formulated interactively using menus or prompts that are provided to the cellular phone user from a remote location.

Various types of navigation services may be requested. For example, the cellular phone user may request driving instructions to a desired destination. To request this type of navigation service, the cellular phone user indicates that driving directions are desired and also indicates a desired destination. As mentioned above, this information may be input by the cellular phone user in response to prompts sent to the cellular phone 110.

Other types of navigation services may be requested. For example, the cellular phone user may request information about the locations of businesses of a particular type near the cellular phone user's position (e.g., the closest McDonald's restaurants). According to another example, the cellular phone user may request driving directions to the closest businesses of a particular type (e.g., driving directions to the closest McDonald's restaurants).

The request 144 for navigation services is sent to a navigation services server 140. The navigation services server 140 is located remotely from the cellular phone 110. The navigation services server 140 may be installed as part of the cellular phone system 142 (of which the cellular phone 110 is also a part), or alternatively, the navigation services server 140 may be installed outside the cellular phone system 142. If the navigation services server 140 is outside the cellular phone system 142, the request for navigation services is initially transmitted over the cellular phone system 142 from which the request is then transmitted over one or more other communications systems or networks 146 to reach the navigation services server 140. For example, the request for navigation services may be transmitted from the cellular phone 110 over the cellular phone system 142 to a land-based telephone system (e.g., the Plain Old Telephone System (POTS)) and then to the navigation services server 140. Alternatively, the request for navigation services may be sent over a WAN or the Internet to the navigation services server 140.

Located in the geographic area 100 is a cellular phone location determining system 150. The cellular phone location determining system 150 may include appropriate hardware and software that are able to locate the positions of a plurality of cellular phones (such as the cellular phone 110) in the geographic area 100. There are various available technologies that can be used to determine the positions of cellular phones in an area. Some of the companies that provide this type of technology include ArrayComm, Inc., Harris Corporation, Corsair Communications, Lockheed Martin Corporation, CELLTRAX, Inc., TruePosition, Inc., Cell-Loc Inc., KSI Inc., and U.S. Wireless Corporation. Some of these technologies can be used to locate a cellular phone user who dials an emergency number, e.g., "911." Any such technology that is presently available or that becomes available in the future may be suitable for the phone location determining system 150 in FIG. 1. The cellular phone location determining system 150 may include towers or other equipment located throughout the geographic area 100. The cellular phone location determining system 150 may be part of the cellular phone system 142 or may be a separate system.

When the cellular phone user requests navigation services, the location of the cellular phone 110 being used by the cellular phone user to make the request is determined. In this first embodiment, the location of the cellular phone 110 used to make the request for navigation services is determined using the cellular phone location determining system 150. The cellular phone location determining system 150 may determine a series of locations, each of which represents a location of the cellular phone 110 at a subsequent point in time. For example, referring to FIG. 1, the cellular phone location determining system 150 determines the locations of the cellular phone 110 at times T(−2), T(−1), and T(0). These locations correspond to the locations P(−2), P(−1), and P(0). Each of the locations, P(−2), P(−1), and P(0) determined by the cellular phone location determining system 150 is identified by geographic coordinates. The geographic coordinates may be absolute coordinates or relative coordinates.

Figure 2:
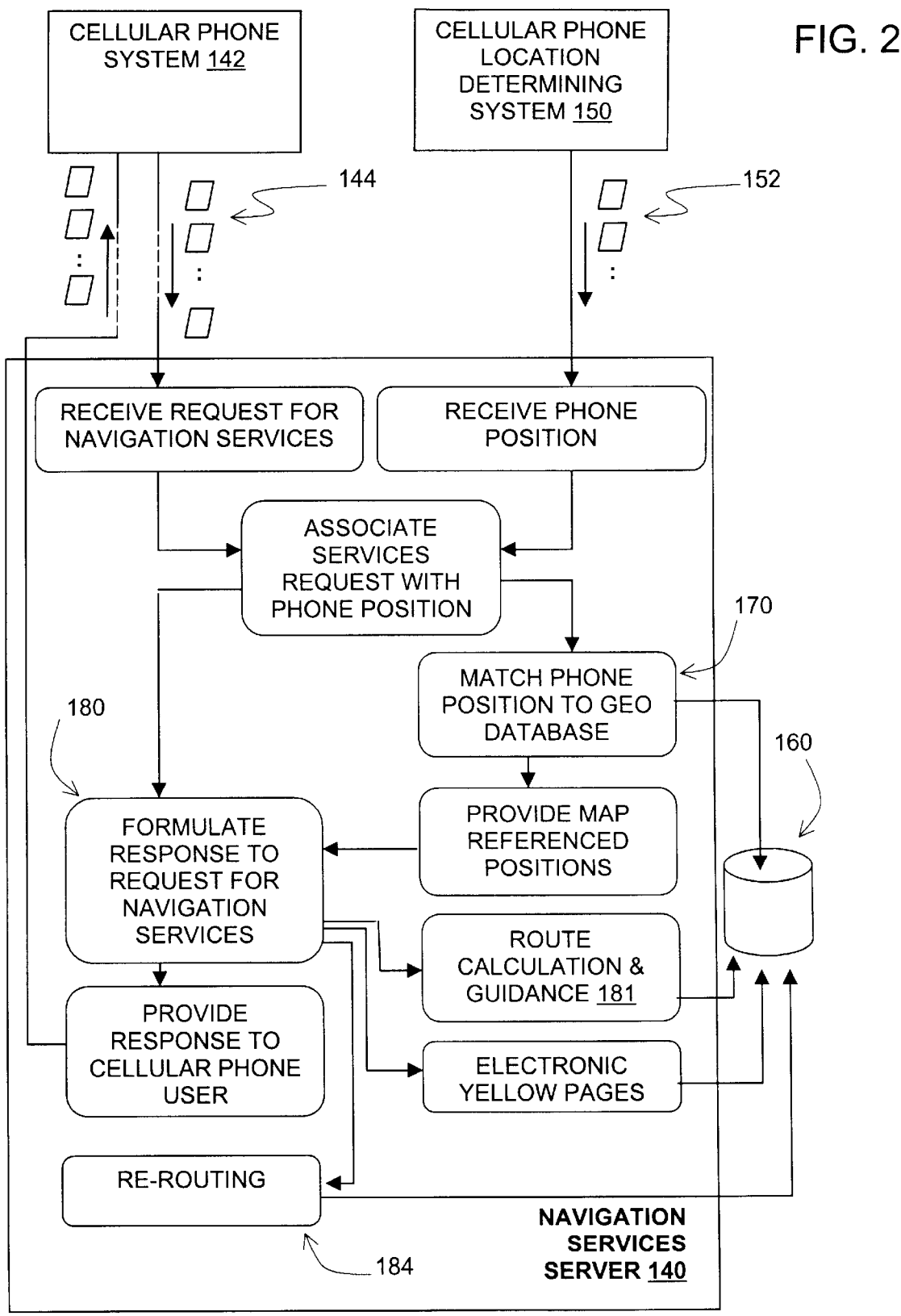
FIG. 2 is a flow chart showing operation of the navigation services server of FIG. 1.

Data 152 indicating the location(s) of the cellular phone 10 are transmitted from the cellular phone location determining system 150 to the navigation services server 140. Referring to FIG. 2, at the navigation services server 140, the data 152 indicating the location(s) of the cellular phone 110 are matched with the request 144 for navigation services. Accordingly, the navigation services server 140 obtains both the request for navigation services and the data indicating the location of the cellular phone 110 from which the request was made.

When the navigation services server 140 has both the request for navigation services and the data indicating the location of the cellular phone 110 from which the request was made, the navigation services server 140 prepares a response to the request for navigation services. First, the position of the requesting cellular phone 110 relative to the road network 118 is determined. This function may be provided by programming (referred to as a "map matching program 170") located on the navigation services server 140 or alternatively, this function may be provided by programming located elsewhere. The map matching program 170 uses a map database 160 for this purpose. The map database 160 contains data about geographic features located in the geographic area 100. The map database 160 contains data about the road network 118, including data indicating the locations of road segments and intersections. The map database 160 may also contain data about other features of roads, such as speed limits (or speed limit ranges), turn restrictions, road names, address ranges, etc. The map database 160 may also contain data about other kinds of geographic features, such as data about the locations and names of rivers, lakes, railroads, tunnels, etc. The map database 160 may also contain data about points of interest, such as businesses, cultural institutions, sports facilities, hospitals, airports, etc.

Using the data 152 indicating the geographic coordinates of the cellular phone 110, the map matching program 170 on the navigation services server 140 attempts to match the position of the cellular phone 110 to a position along a road segment represented by data contained in the map database 160. The map matching program 170 compares the geographic coordinates of the cellular phone 110 to the geographic coordinates of the road segments represented by data in the map database 160. As stated above, the cellular phone location determining system 150 may determine a series of locations representing positions of the cellular phone 110 at subsequent points in time. If data indicating a series of locations of the cellular phone are available, the map matching program 170 uses these data when matching the location of the cellular phone 110 to a road segment. For example, if the series of locations of the cellular 110 phone describes a path, the geometry and location of the path are matched to the geometry and/or location of road segments represented by data in the map database 160. Using a series of locations, the direction and/or heading of the cellular phone 110 along the road can also be determined.

Figure 3:
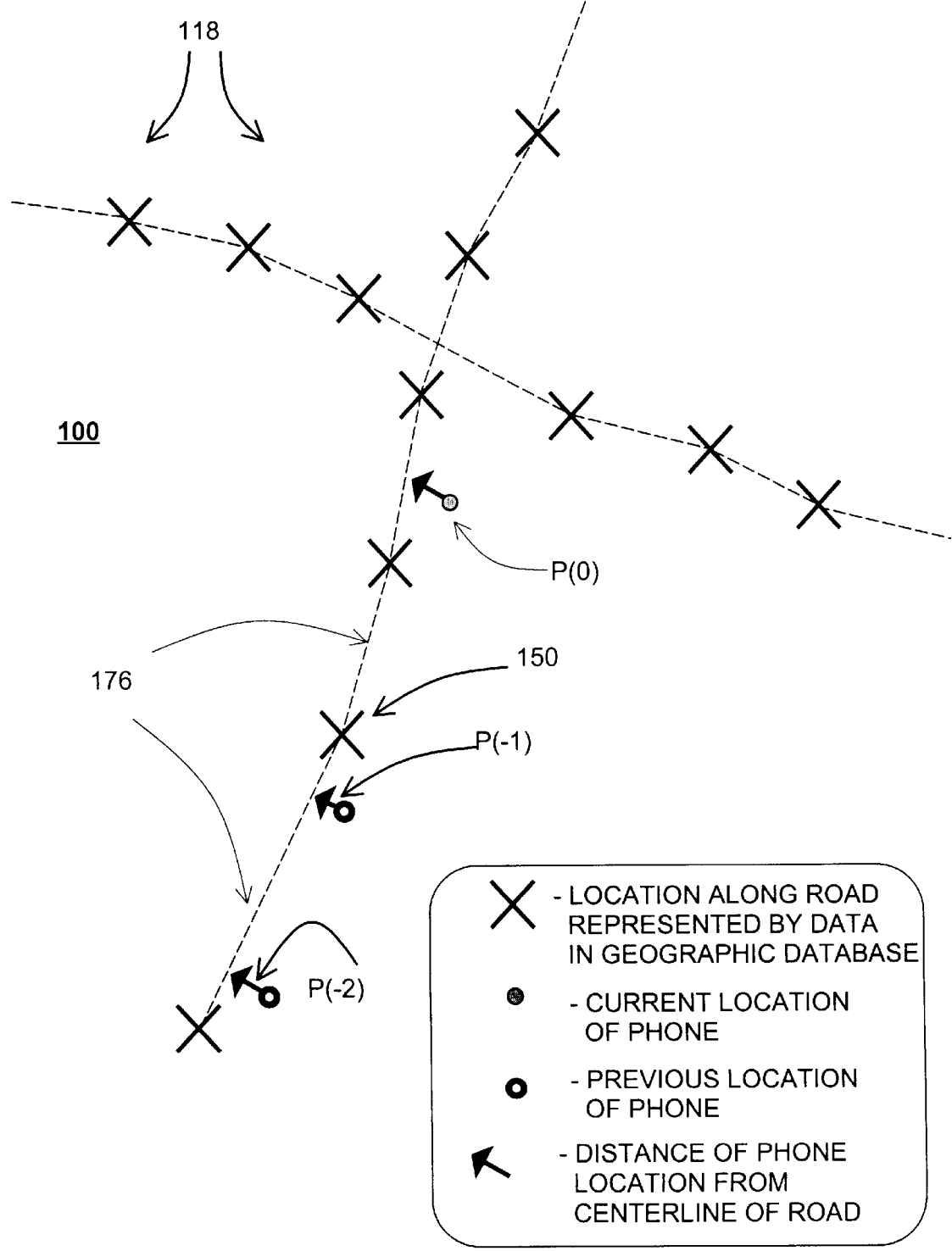
FIG. 3 is a map illustrating operation of the map matching program of FIG. 2.

FIG. 3 illustrates operation of the map matching program 170. In the map database 160, each road is represented by data that identify the geographic coordinates of locations along the road. These locations include the locations at which each road intersects with other roads and may also include locations along the road between intersections with other roads. FIG. 3 shows the locations (marked with "X's") that are used to represent roads. The coordinates of the locations marked with "X's" are stored in the map database 160. By connecting the "X's" with lines 176, an approximation of the actual location of the represented road can be determined.

In order to determine whether the cellular phone is located on a road, the positions of the cellular phone are compared to the lines 176. If the distance between the positions of the cellular phone and the lines 176 are sufficiently small, it can be determined that the cellular phone is located in a vehicle traveling along the represented road. In the example of FIG. 3, if a series of positions of the cellular phone are available, the map matching program 170 can compare the distances of each of series of positions of the cellular phone to the lines 176 representing the road. If the path described by the series of cellular phone positions corresponds to the path of the road (as described by the lines connecting the series of points used to represent the road), a determination can be made that the cellular phone is in a vehicle traveling along the road. Using a series of positions of the cellular phone, the map matching program 170 can also determine the heading of the vehicle in which the cellular phone is located. Using the series of positions of the cellular phone, the map matching program 170 can also determine the speed of the vehicle in which the cellular phone is located is traveling.

Referring again to FIG. 2, at the same time or after the map matching program 170 determines a position and heading of the cellular phone 110 along a road segment, another program 180 on the navigation services server 140 prepares a response to the request for navigation services. As mentioned above, there are various different kinds of navigation services that the navigation services server 140 can provide. In one example, the requested type of navigation service is route guidance to a desired destination. If the request for navigation services is for route guidance, the request 144 includes an identification of the destination to which route guidance is desired.

Once the navigation services server 140 has an identification of a desired destination, a route is calculated to the desired destination from the position of the cellular phone. As mentioned above, the position of the cellular phone is determined by the map matching program 170 using the data 152 from the cellular phone location determining system 150. The route is calculated by a program 181 using data contained in the map database 160. The route is calculated using any of various route calculating algorithms, such as those used in in-vehicle navigation systems. Examples of route calculation programs are described in the copending patent application Ser. No. 09/047,698, filed Mar. 25, 1998, the entire disclosure of which is incorporated by reference herein.

After a route is calculated, instructions for following the route are formulated and provided to the cellular phone user. Method for formulating instructions are described in the copending patent applications, Ser. Nos. 08/893,201 and 09/196,279 the entire disclosures of which are incorporated by reference herein. These instructions may be provided audibly. If the cellular phone has a display screen, the instructions may be provided as text or graphics.

If the route is relatively long or complicated, it may be preferable that the driving instructions not be provided to the cellular phone user all at once (i.e., since it would be too hard to remember all the instructions). Instead, it may be preferable that the driving instructions be provided to the cellular phone user one-at-a-time or in small groups of related instructions. Moreover, if the driving instructions are provided to the cellular phone user one-at-a-time or in small groups of related instructions, it is further desirable that the instructions be provided to the cellular phone user at pertinent times and/or locations as the cellular phone user is following the route. This can be accomplished using the cellular phone location determining system 150.

According to this alternative, after driving instructions have been prepared for advising the cellular phone user to reach a desired destination, the driving instructions are in the form of a list of instructions for the driver to follow to reach the desired destination. Each of these instructions may be associated with a specific driving maneuver to be made at a certain point along the route. For example, one instruction may be "TURN LEFT AT THE NEXT INTERSECTION." Another instruction may be "STAY IN THE RIGHT LANE TO EXIT ONTO INTERSTATE 290." In order to make these instructions meaningful to the driver, it is preferable that the appropriate instruction be provided at a relatively short time or distance (but not too short a time or distance) before the actual driving maneuver needs to be taken. For example, when it is necessary to make a left turn ahead, the instruction "MAKE A LEFT TURN AT THE NEXT INTERSECTION" may be made as soon as the immediately previous intersection is crossed. Exceptions may be made when intersections are closely spaced together. Alternatively, the driving instruction may be provided about 10–15 seconds before the time when the maneuver is required (taking into account the vehicle speed and/or the speed limit along the road upon which the vehicle is traveling). Alternatively, the driving instructions may be provided using both travel distance and travel time to the required maneuver. In some circumstances, it may be preferable to group one or more driving instructions together if the corresponding maneuvers indicated by the instructions are close together.

Using the cellular phone location determining system 150, the position of the cellular phone 110 is continuously determined after the route guidance is requested. As the vehicle 114 in which the cellular phone 110 is located travels along roads, the location of the cellular phone 110 (and hence the vehicle 114) is determined using the map matching program 170, as described above. Using this information, the navigation services server 140 provides the appropriate instruction based upon the location of the cellular phone, as determined using the data from the cellular phone location determining system 150. For example, assume the vehicle 114 in which the cellular phone 110 is located is approaching an intersection associated with one of the driving maneuvers associated with instructions determined by the navigation services server 140 in response to a previous request for route guidance from the user of the cellular phone 110. The cellular phone location determining system 150 obtains data indicating the location of the cellular phone 110. These data are forwarded to the navigation services server 140 where the map matching program 170 matches the location of the cellular phone 110 to a road represented by data contained in the map database 160. The route guidance program 181 on the navigation services server 140 matches the position of the cellular phone 110 to the positions at the which the driving instructions are to be provided. If the cellular phone 110 is at one of the positions at which a driving instruction is to be provided, the navigation services server 140 provides the appropriate driving instruction to the cellular phone user via the cellular phone 110. This process continues until the cellular phone user reaches the desired destination.

The cellular phone location determining system 150 can also be used for re-routing purposes. For example, a cellular phone user who is following driving instructions for reaching a desired destination may depart from the route for which driving instructions are being received from the navigation services server 140. This departure may be intentional or unintentional. As stated above, the cellular phone location determining system 150 continuously acquires data indicating the location of the cellular phone 110 after the cellular phone user requests route guidance to a desired destination. These data are used by the map matching program 170 located at the navigation services server 140 to determine on which road the cellular phone is located. If the cellular phone user has departed from the calculated route to the desired destination, the map matching program 170 will indicate that the cellular phone 110 is on a road that is not part of the calculated route. A program 184 on the navigation services server 140 will log that the cellular phone has departed from the calculated route. According to one mode of operation, the program 184 will send a message to the cellular phone user indicating that the cellular phone user has departed from the calculated route which was being followed to the desired destination. According to this mode of operation, the program 184 will also automatically calculate a new route to the previously indicated destination from the current location of the cellular phone. Alternatively, the program 184 may not operate automatically, but instead will first request the cellular phone user to indicate whether he/she would like the navigation services server to calculate a new route from the current location of the cellular phone to the previously indicated destination. According to an alternative embodiment, the program 184 may automatically provide guidance for returning to the calculated route or request the cellular phone user whether he/she would like to be provided guidance for returning to the calculated route.

As stated above, when the cellular phone user requests navigation services from the navigation services server 140, the map matching program 170 on the navigation services server 140 attempts to determine on which road the cellular phone 110 is located using data 152 obtained from the cellular phone location determining system 150. Under some circumstances, the map matching program 170 may fail to determine on which road the cellular phone 110 is located. This may occur because of errors in the determination of the cellular phone position by the cellular phone location determining system 150. Alternatively, the map matching program 170 may fail to determine on which road the cellular phone 110 is located because the cellular phone may not be located on a road represented by data in the map database 160. For example, the cellular phone 110 may be located outside a vehicle and away from a road. When the map matching program 170 is unable to determine that the cellular phone is located on a road represented by data in the map database 160, the navigation services server 140 sends a message to the cellular phone user indicating that the position of the cellular phone cannot be associated with a road. The cellular phone user may be provided with the option of indicating his/her position. The cellular phone user may indicate his/her position vocally or by using manual input into the keypad of the cellular phone. The cellular phone user may be provided with prompts for this purpose. For example, if the map matching program 170 determines that the cellular phone is located between two roads, the cellular phone user may be requested to indicate on which of the two roads he/she is located.

As stated above, if the route is relatively long or complicated, it may be preferable that the driving instructions be provided to the cellular phone user as groups of one or more individual instructions which are provided to the cellular phone user at appropriate times and locations as the required driving maneuver is being approached. If the route is not long or complicated, it may be preferable to provide the driving instructions to the cellular phone user all at once instead of in groups of one or more instructions. If the driving instructions are provided to the cellular phone user all at once, it may not be necessary that the cellular phone location determining system 150 continue to monitor the location of the cellular phone user as the route is being followed. An exception may be made to determine whether the cellular phone user has departed from the calculated route.

(It is noted that the cellular phone location determining system 150 cannot only determine the location of the cellular phone 110 from which the request for navigation services was sent, but also the locations of each of a plurality of cellular phones located in the geographic area 100. Some of these other cellular phones may also be requesting navigation services while others of the cellular phones may not be requesting navigation services.)

II. ALTERNATIVE EMBODIMENTS

In the embodiments described above, it was stated that the navigation services server uses the data from the cellular phone location determining system when formulating a response to a request for navigation services. According to the embodiments described above, the navigation services server uses, by default, the current cellular phone position as a starting point for the requested navigation service. In an alternative embodiment, the cellular phone user can specify a location other than the current cellular phone position as a starting point for the navigation service being requested. For example, the cellular phone user may want driving directions from a location from which he/she will pick up a car later. According to this alternative, when the cellular phone user requests a navigation service, he/she is provided with the option to specify a location other than the current cellular phone location as the starting point for the navigation service. If the cellular phone user specifies a location other than the current cellular phone location as the starting point for the requested navigation service, the navigation services server formulates an appropriate response using the location indicated by the cellular phone user as the starting point. If the requested navigation service includes providing driving instructions to be provided to the cellular phone user as the cellular phone user is following a calculated route, the cellular phone location determining system can be used to determine the position of the cellular phone after the cellular phone user embarks on the calculated route, as described above.

In the embodiments described above, it was stated that the cellular phone was located in a vehicle. In alternative embodiments, the cellular phone is not necessarily located in a vehicle. The following examples relate to alternative embodiments in which the cellular phone is not located in a vehicle for at least a portion of the time.

In one alternative embodiment, the navigation services server can provide navigation-related services to cellular phone users who are pedestrians. According to this alternative, when requesting navigation services, the cellular phone user is provided with an option that the navigation services be tailored for a pedestrian. When this option is specified, the navigation services server formulates a response to the request for navigation services that is suitable for pedestrian use. For example, if the cellular phone user wants a walking route to a desired destination from a current location, the route calculated by the navigation services server avoids roads upon which pedestrian travel is not permitted, e.g., expressways. However, when providing a route to be followed by foot to a desired destination, the navigation services server ignores one-way street restrictions, turn restrictions at intersections, and other restrictions that do not apply to pedestrians.

The instructions that can be provided to a cellular phone user who is traveling on foot can be different and/or more detailed than the kinds of instructions provided to a vehicle driver. For example, the cellular phone user who is traveling on foot can be provided with instructions to take an elevator to a particular floor in a building. Also, the cellular phone user can be provided with instructions how to reach a particular store in a large shopping mall.

In another alternative, the navigation services server can provide navigation services that combine modes of travel. As an example, a cellular phone user requests a route to a desired destination. By default, the route calculated by the navigation services server is a route for a motor vehicle. As described above, as the cellular phone user follows the route, the cellular phone location determining system continues to determine the location of the cellular phone and provides data indicating this position to the navigation services server. Using this data, the navigation services server provides appropriate driving instructions as the cellular phone approaches locations along the route at which driving maneuvers are required. If parking is not available at the destination, the cellular phone user may decide to park his/her car near the destination and walk the remaining distance to the destination. After the cellular phone user parks his/her car, the cellular phone user may take the cellular phone from the vehicle and continue to receive guidance for reaching the desired destination from the location at which the car was parked. When the cellular phone user parks his/her car, the cellular phone user indicates by appropriate manual or vocal input to the cellular phone that guidance to travel the remaining distance to the destination by foot is desired. The navigation services server recalculates the remaining portion of the route to the destination from the location at which the vehicle was parked, taking into account that the route will be traveled by foot. As mentioned above, the navigation services server may choose different roads if travel is by foot rather than by vehicle. The navigation services server provides walking instructions to the cellular phone user to reach the destination by foot from the location at which the vehicle has been parked. As before, the cellular phone location determining system determines the location of the cellular phone as it is being carried by the cellular phone user on foot toward the destination. Walking instructions are provided at appropriate locations are approached, as necessary.

In another alternative embodiment, the navigation services server can provide navigation-related services to cellular phone users who are bicyclists. According to this alternative, when requesting navigation services, the cellular phone user is provided with an option that the navigation services be tailored for a bicycle. When this option is specified, the navigation services server formulates a response that is suitable for a bicyclist. For example, if the cellular phone user wants a bicycle route to a desired destination from a current location, the route calculated by the navigation services server avoids roads upon which bicycle travel is not permitted, e.g., expressways.

In the embodiments described above, it was stated that navigation-related services, such as driving instructions, can be provided via the cellular phone while the cellular phone user is progressing along a calculated route following the instructions formulated by the navigation services server. These instructions can be provided as audio instructions which are provided over the speaker of the cellular phone. In one embodiment, these audible instructions are provided as one or more telephone messages or telephone calls. In one embodiment, all the driving instructions are provided in one telephone call with the delivery of each particular driving instruction timed to coincide with the arrival of the cellular phone at the appropriate location along the route at which the corresponding driving instruction is pertinent (as determined using the cellular phone location determining system, as described above). According to another embodiment, each separate driving instruction is provided as a separate telephone call with the timing of the telephone call determined to coincide with the arrival of the cellular phone at the appropriate location along the route at which the corresponding driving instruction is pertinent. However, if the driving instructions are provided as more than one telephone call, it preferable that the cellular phone user not have to answer the phone to receive the audio driving instruction. Thus, in a preferred embodiment, the driving instructions are provided automatically, without the requirement that the cellular phone user answer a separate telephone call for each instruction. In this mode of operation, the cellular phone automatically provides the audible driving instruction at the appropriate time and/or location. Each instruction may be preceded by a tone which draws the cellular phone user's attention to the driving instruction.

According to another alternative, the cellular phone user can make and receive cellular phone calls while receiving the driving instructions. According to one embodiment, in order to use the cellular phone to receive driving instructions while also carrying on a telephone conversation, one of these functions is given priority. Because some of the driving instructions are meaningful only if provided at specific times and/or locations (e.g., "TURN LEFT AT THE NEXT INTERSECTION"), driving instructions are given priority over the telephone conversation by default. Thus, if the cellular phone user is using the cellular phone to carry on a telephone conversation and the cellular phone is moved to a location at which a driving instruction should be provided, the telephone conversation is temporarily interrupted while the driving instruction is provided to the cellular phone user. The driving instruction can be preceded by a tone that indicates that the telephone conversation is temporarily being interrupted while the driving instruction is provided to the cellular phone user. The tone and the driving instruction may be audible to both the cellular phone user and the person with whom the cellular phone user is carrying on a telephone conversation. Alternatively, the tone and the driving instruction may be audible to only the cellular phone user while the person with whom the cellular phone user is carrying on a telephone conversation is informed by a recorded message that the telephone conversation is temporarily being interrupted. According to another alternative, if the party with whom the cellular phone user is carrying on a telephone conversation is talking when the driving instruction is being provided to the cellular phone user, the person's speech is temporarily recorded electronically in a buffer and played back to the cellular phone user after the driving instruction has been provided.

Figure 4:
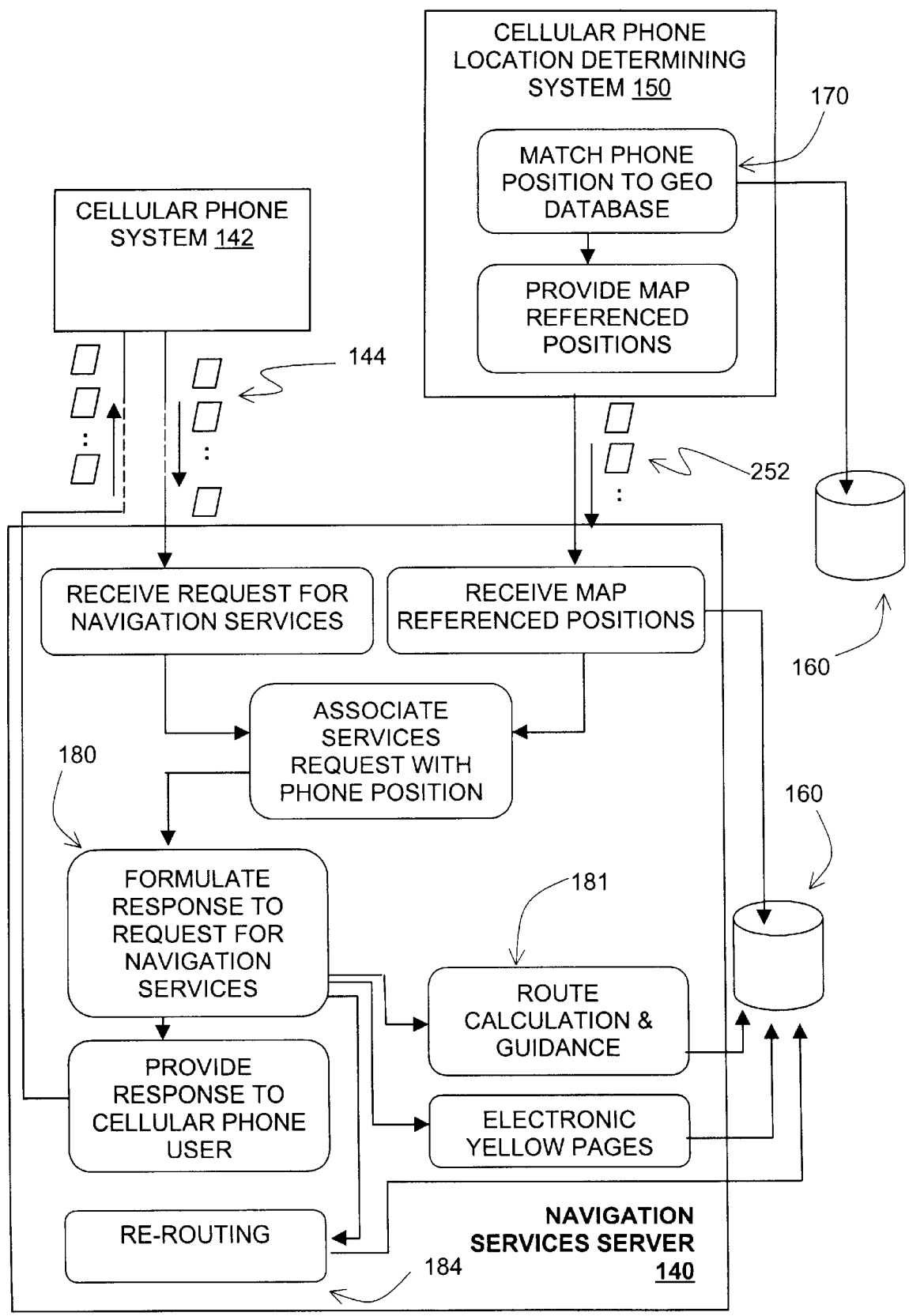
FIG. 4 is an illustration of an alternative embodiment of the present invention.

As described above, the map matching program receives the geographic coordinates of the cellular phone from the cellular phone location determining system and relates these geographic coordinates to the road network. In embodiments described above, the map matching program was described as part of the navigation services server. The map matching function does not have to be performed on the navigation services server. Instead, the map matching function can be provided at another location. For example, the map matching function can be provided at the cellular phone location determining system. If the map matching function is provided at the cellular phone location determining system, data indicating the location of the cellular phone with respect to the road network is provided from the cellular phone location determining system to the navigation services server. This data received from the cellular phone location determining system would be matched to the request for navigation services at the navigation services server. FIG. 4 illustrates this alternative in which the map mapping function is provided at the cellular phone location determining system 150. In FIG. 4, data 252 indicating the map-referenced positions are provided from the cellular phone location determining system 150 to the navigation services server 140 where these data 252 are associated with the request 144 for navigation services from the cellular phone system 142.

In some of the embodiments described above, it was stated that navigation-related guidance could be provided to a cellular phone user in groups of one or more driving instructions as the cellular phone user progresses toward a desired destination. In one embodiment, the driving instructions are stored on the navigation services server and transmitted to the cellular phone at the appropriate times, such as when the cellular phone user approaches a location at which a driving maneuver is required. In another embodiment, the driving instructions are downloaded to the cellular phone and stored in a memory of the cellular phone. The driving instructions are then played back one at a time as desired by the cellular phone user. For example, the cellular phone user can have all the instructions provided at one time, each instruction provided separately one at a time, or can scroll back and forth in order to have some instructions played back more than once. In still another embodiment, the driving instructions are downloaded to the cellular phone and stored in a memory of the cellular phone. The driving instructions are then played back at the appropriate times, such as when the cellular phone user approaches a location at which a driving maneuver is required. The cellular phone is provided with a signal from the cellular phone location determining system that indicates when each instruction should be played back.

The disclosed methods and systems are not limited to cellular phones. The disclosed methods and systems may be used with other types of devices, such as pagers, personal information managers, PalmPilot®-type devices, portable modems, portable computers and other types of wireless phone devices. Any portable communication device whose position can be determined by an external location determining system can be used.

As mentioned above, embodiments of the present system can be used with any type of portable communications device or technology that conforms to existing wireless specifications, such as the WAP specification. Embodiments can be used with other existing specifications or with specifications that are developed in the future.

III. ALTERNATIVE EMBODIMENT WITH GPS IN CELLULAR PHONE

In the embodiments described above, the location of each cellular phone was determined using a cellular phone location determining system which is capable of determining the locations of cellular phones throughout a geographic area. The cellular phone location determining system, described above, uses known technology or techniques, such as signal triangulation between towers, signal direction detection and so on, to determine positions of cellular phones. According to an alternative embodiment, some or all the cellular phones may include positioning hardware. This positioning hardware may include a GPS receiver, for example. According to this alternative embodiment, a cellular phone user who has a cellular phone which is equipped with positioning hardware can use the positioning hardware in connection with obtaining navigation-related services.

According to this alternative, when requesting navigation-related services, a cellular phone user sends data indicating his/her current location along with the request. The data indicating his/her current location may not necessarily be referenced to the road network. For example, if the positioning hardware included in the cellular phone is a GPS system, the data accompanying the request for navigation services would include the geographic coordinates of the cellular phone. When the navigation services server receives the request for navigation services and the data indicating the geographic coordinates of the cellular phone user, the navigation services server uses the map matching program 170 to reference the cellular phone position to the data in the map database. The navigation services server handles data indicating geographic coordinates received from a cellular phone is a similar manner as it handles data indicating geographic coordinates received from the cellular phone location determining system. In this manner, the navigation services server can determine where on the road network the cellular phone is located.

After the navigation services server relates the position of the cellular phone to a location along a road represented by data in the map database, a response to the request for navigation services is formulated, in a similar manner as described above. When navigation services, such as driving instructions, are being provided while the cellular phone user is traveling a route, the map matching program 170 uses the geographic coordinates determined by the positioning hardware in the cellular phone to follow the progress of the cellular phone along the calculated route. The pertinent instructions can then be provided when the cellular phone user is located at the appropriate location along the route.

Figure 5:
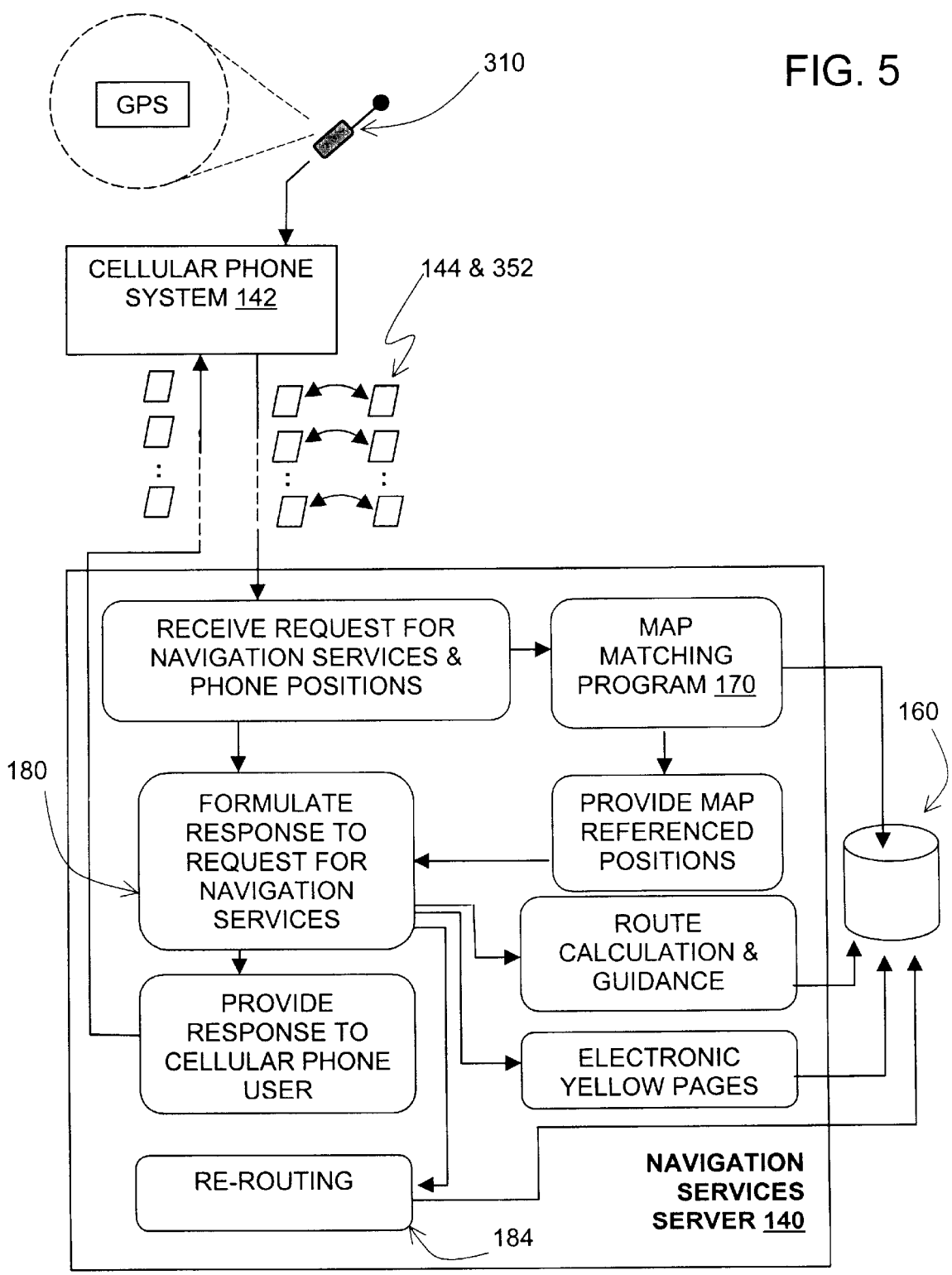
FIG. 5 is an illustration of another alternative embodiment of the present invention.

FIG. 5 illustrates this alternative in which a cellular phone 310 has positioning hardware that determines the geographic coordinates of the cellular phone. In FIG. 5, data 352 indicating the geographic coordinates of the cellular phone 310 are provided along with the request 144 for navigation services from the cellular phone system 142 to the navigation services server 140. In this alternative, a cellular phone location determining system is not necessarily used.

In a further alternative, the embodiment of FIGS. 1–3 can be combined with the embodiment of FIG. 5. In this alternative embodiment, some cellular phones in a geographic area are equipped with positioning hardware and other cellular phones in a geographic area are not equipped with positioning hardware. In this alternative, cellular phone users who have cellular phones equipped with positioning hardware transmit data indicating their positions along with their requests for navigation services whereas cellular phone users who do not have cellular phones equipped with positioning hardware rely on a cellular phone location determining system to determine their locations. When the navigation services server receives a request for navigation services that is not accompanied by geographic coordinates, the navigation services server obtains the geographic coordinates of the cellular phone from the cellular phone location determining system. Even if a cellular phone is equipped with positioning hardware, such a GPS system, there are times when the positioning hardware may be unable to determine the geographic coordinates of the cellular phone, e.g., when the cellular phone is around tall buildings. Under these circumstances, a cellular phone user using a cellular phone equipped with positioning hardware may use the cellular phone location determining system to determine the geographic coordinates of his/her location.

In another alternative, the data indicating a cellular phone position received from a cellular phone equipped with positioning hardware can be combined with the data indicating a cellular phone position received from a cellular phone location determining system. By combining the data from these two sources, a more accurate or reliable position may be obtained.

IV. ADVANTAGES

The present system and method provide for delivering navigation services to users of cellular phones. In some of the disclosed embodiments, these navigation services can be provided without expensive modification to existing cellular phones because the technology for determining the position of each cellular phone is provided by means which are external to the cellular phone.

It is intended that the foregoing detailed description be regarded as illustrative rather than limiting and that it is understood that the following claims including all equivalents are intended to define the scope of the invention.

I claim:

1. A method of providing navigation services to a plurality of cellular phone users who are pedestrians comprising the steps of:

using a cellular phone location determining system to determine geographic positions of a plurality of cellular phones that are used by pedestrians in a geographic area;

receiving requests for navigation services from said plurality of cellular phones;

matching the positions of each of said plurality of cellular phones that are used by pedestrians to positions of roads represented by data in a geographic database;

using said geographic database to determine responses to said requests for navigation services; and transmitting said responses to said plurality of cellular phones that are used by pedestrians.

2. The method of claim 1 further comprising the step of:

over a period of time, using the cellular phone location determining system to determine a direction of travel of each of said plurality of cellular phones for which said positions were determined.

3. The method of claim 2 wherein said direction of travel for each cellular phone is determined relative to a road upon which said cellular phone is determined to be located.

4. The method of claim 1 wherein at least some of said requests are for instructions for traveling to specified destinations.

5. The method of claim 4 wherein said instructions for traveling to specified destinations are provided to cellular phone users in groups of one or more instructions, wherein each of said groups is provided as a cellular phone to which the instructions are being provided approaches a location to which said instructions are pertinent.

6. The method of claim 1 wherein at least some of said requests are for locations of businesses of a specified type located around a cellular phone position.

7. A system for providing navigation services to cellular phone users who are pedestrians comprising:

a cellular phone system;

a cellular phone location determining system capable of determining locations of cellular phones that are used by pedestrians in a geographic area; and a navigation services server that receives requests for navigation services from cellular phone users who are pedestrians using said cellular phone system and wherein said navigation services server also receives data from said cellular phone location determining system that indicates locations of cellular phones that are used by pedestrians from which said requests were made.

8. The system of claim 7 further comprising:

a map matching program that references said locations of said cellular phones to roads represented by data in a map database.

9. The system of claim 8 wherein said map matching program is part of said cellular phone location determining system.

10. The system of claim 8 wherein said map matching program is part of said navigation services server.

11. The system of claim 7 wherein some of said cellular phones include positioning system hardware that provides data indicating a geographic location of an associated cellular phone, and wherein said navigation services server receives said data indicating a geographic location of an associated cellular phone from said cellular phones that include said positioning system hardware.

12. A method of providing navigation guidance comprising the steps of:

from a first cellular phone, transmitting a request for navigation guidance to a navigation services server;

using a cellular phone location determining system that determines positions of a plurality of cellular phones throughout a geographic area to determine a first position of said first cellular phone at a first point in time;

transmitting data indicating said first position of said first cellular phone from said cellular phone location determining system to said navigation services server;

formulating a response to said request, wherein said response includes a series of traveling instructions to be provided to the first cellular phone;

providing said response to said first cellular phone;

after the step of formulating a response to said request, receiving an indication that a remaining portion of a route to a desired destination should be provided as walking instructions;

using the cellular phone location determining system to determine a second position of said first cellular phone, wherein said second position corresponds to when said indication was made; and providing walking instructions from said second position of said first cellular phone to said desired destination.

13. The method of claim 12 further comprising the steps of:

after the step of formulating a response to said request, using the cellular phone location determining system to continue to determine positions of said first cellular phone; and providing said traveling instructions in separate groups of one or more traveling instructions, wherein each of said groups is provided as the first cellular phone approaches a location to which the traveling instructions pertain.

14. The method of claim 12 wherein said traveling instructions are driving instructions.

15. The method of claim 12 wherein said traveling instructions are walking instructions.

16. The method of claim 12 wherein said traveling instructions are instructions for travel by bicycle.

17. The method of claim 12 further comprising the step of:

on the navigation services server, associating the request for navigation guidance with said data indicating said first position of said first cellular phone.

18. The method of claim 12 wherein said response is provided to a user of said first cellular phone while said first cellular phone is being used for a voice telephone call.

19. The method of claim 12 further comprising:

determining a direction of travel of said first cellular phone along a road.

20. A method of providing navigation services to a user of a cellular phone that includes positioning system hardware, the method comprising the steps of:

on a navigation services server, receiving a request for navigation services from said cellular phone, wherein said request is accompanied by data from said positioning system hardware in said cellular phone that indicates a geographic position of said cellular phone;

using a map matching program located on said navigation services server to reference said geographic position of said cellular phone to a location on a road network represented by data in a map database associated with said navigation services server;

formulating a response to said request, wherein said response takes into account said location of said cellular phone on the road network; and providing said response to said cellular phone.

* * * * *